(12) United States Patent
Campagnolo

(10) Patent No.: US 6,170,356 B1
(45) Date of Patent: Jan. 9, 2001

(54) BRAKE ACTUATING LEVER FOR A BICYCLE

(75) Inventor: Valentino Campagnolo, Vicenza (IT)

(73) Assignee: Campagnolo S.r.l., Vicenza (IT)

( * ) Notice: Under 35 U.S.C. 154(b), the term of this patent shall be extended for 0 days.

(21) Appl. No.: 09/332,001

(22) Filed: Jun. 14, 1999

(30) Foreign Application Priority Data

Jul. 15, 1998 (IT) .............................................. TO98A0618

(51) Int. Cl.⁷ ...................................................... G05G 1/14
(52) U.S. Cl. ................................................ 74/523; 74/519
(58) Field of Search ....................................... 74/519, 523

(56) References Cited

U.S. PATENT DOCUMENTS

| | | | |
|---|---|---|---|
| 3,101,120 | * 8/1963 | Huthsing, Jr. | ........................... 74/523 |
| 3,733,922 | * 5/1973 | Tripp | ...................... 74/523 |
| 3,803,941 | * 4/1974 | Yoshikawa | .............................. 74/523 |
| 4,318,307 | * 3/1982 | Kine | .................... 74/523 X |
| 4,730,509 | * 3/1988 | Hornady | .............................. 74/523 X |
| 4,889,355 | * 12/1989 | Trimble | .............................. 281/281.1 |
| 5,217,354 | * 6/1993 | Neward | .............................. 74/523 X |
| 5,277,080 | * 1/1994 | Roelle | ............................... 74/523 X |
| 5,499,548 | * 3/1996 | Keller | ................................ 74/523 X |
| 5,531,136 | * 7/1996 | Tyler | ...................... 74/523 |
| 5,592,700 | * 1/1997 | Genesse | .................. 4/246.1 |
| 5,881,605 | * 3/1999 | Doolittle et al. | ........................ 74/512 |

* cited by examiner

Primary Examiner—Khoi Q. Ta
(74) Attorney, Agent, or Firm—Sughrue, Mion, Zinn, Macpeak & Seas, PLLC

(57) ABSTRACT

A brake actuating lever for a bicycle comprises a body made in one piece of thermoformable material, reinforced with long structural fibres. To the anchoring pin for anchoring the brake actuating cable there is associated a metal bush having one portion deformed on the anchoring pin so as to connect the latter rigidly to the lever.

3 Claims, 4 Drawing Sheets

BRAKE ACTUATING LEVER FOR A BICYCLE

The present invention relates to brake actuating levers for bicycles, of the type comprising a body including a channel-shaped end portion having two wings provided with a first pair of facing holes for engagement of an articulation pin for articulation of the lever to a supporting body, and a second pair of facing holes for engagement of the ends of an anchoring pin for anchoring a brake actuating cable, said anchoring pin having a transverse hole for engagement of one end of the cable.

The object of the present invention is that of providing a lever of the above indicated type which is lighter with respect to the levers provided heretofore, so that it is particularly adapted for example to be used in race bicycles, the lever having adequate strength characteristics.

A further object of the invention is to provide a lever of the above indicated type which can be assembled on the bicycle and connected to the brake actuating lever, with simple and rapid operations.

In view of achieving the above mentioned main object, the invention provides a brake actuating lever having all the above indicated features and further characterised in that the body of the lever is made in one piece of thermoformable plastic material reinforced with long structural fibres. The reinforcing fibre may be carbon fibre, kevlar or AKZO-M5 (trademark).

Moreover, in view of achieving the secondary object indicated above, preferably the anchoring pin of the cable provided on the lever according to the invention has its end engaged within respective facing holes of the end portion of the lever and is surrounded by a metal bush having its ends facing the inner surfaces of the two wings of said portion of the lever. The metal bush has two opposite transverse holes which are aligned with the transverse hole of the anchoring pin. The edge of one of said transverse holes of the metal bush is deformed within the facing end of the transverse hole of the anchoring pin, so as to rigidly connect the bush to the anchoring pin. In this manner, the pin is held axially on the lever, since any movement thereof along the axial direction is prevented by the engagement of the two end surfaces of the metal bush against the inner surfaces of the two wings of the end portion of the lever.

Figure 1:
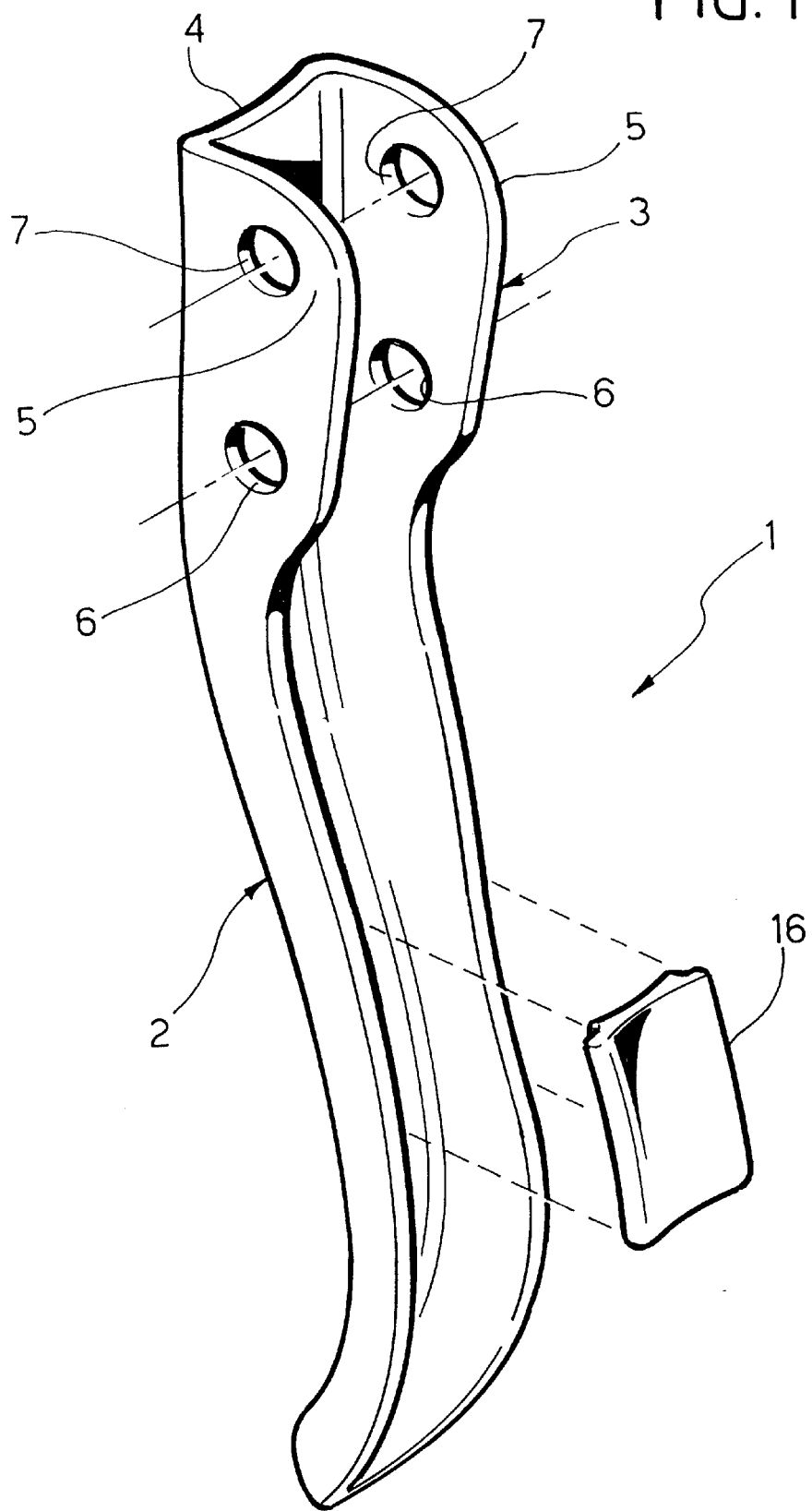
Figure 2:
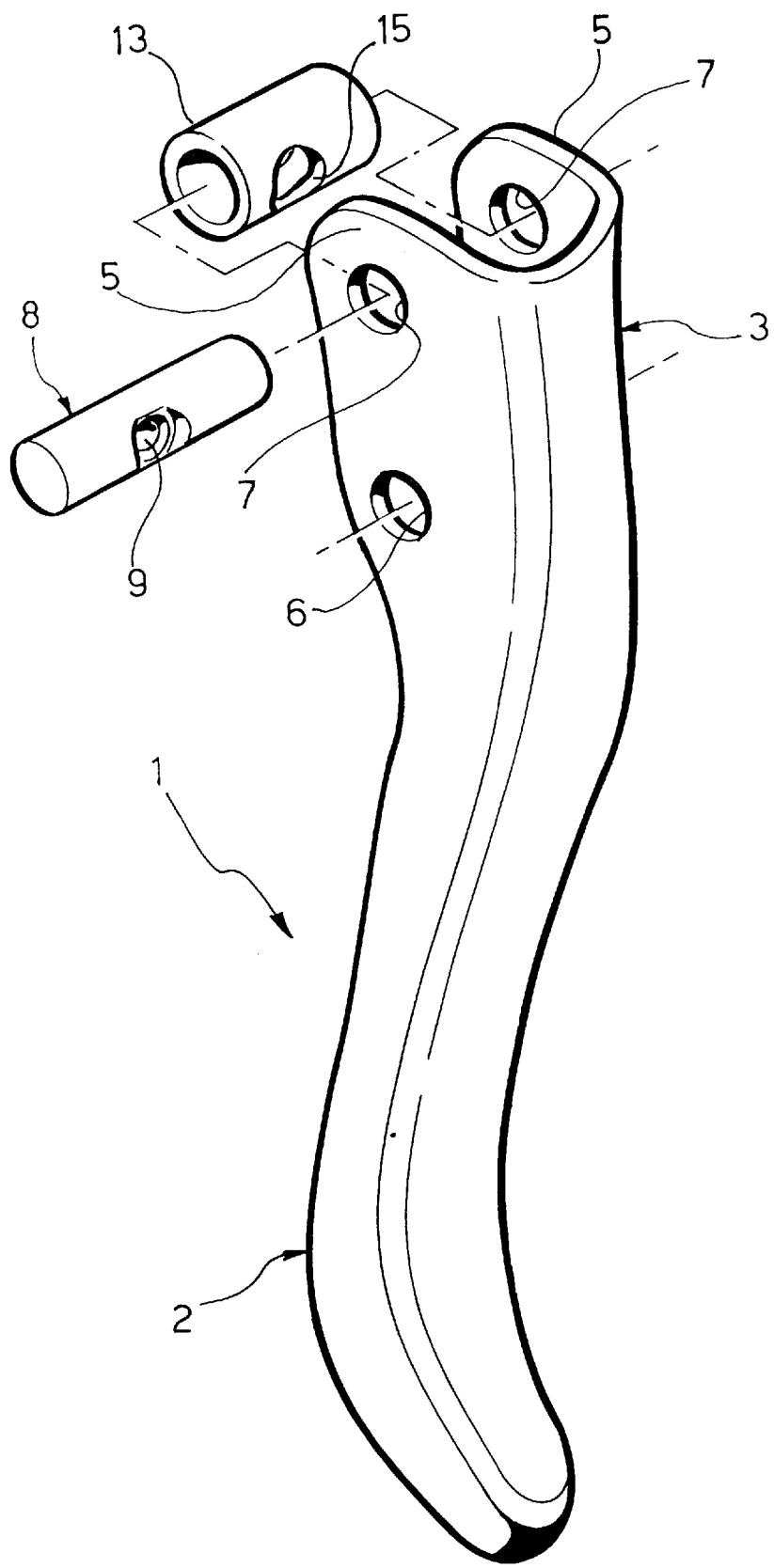
Figure 3:
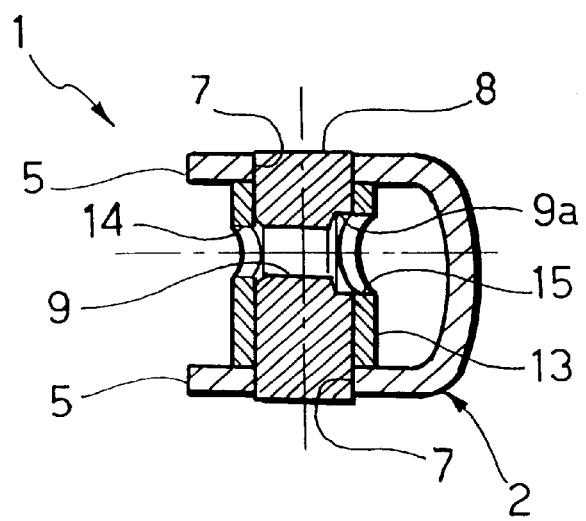
Figure 4:
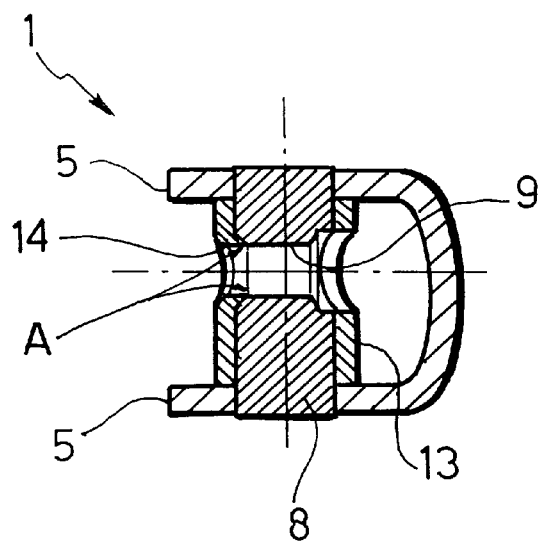
Figure 5:
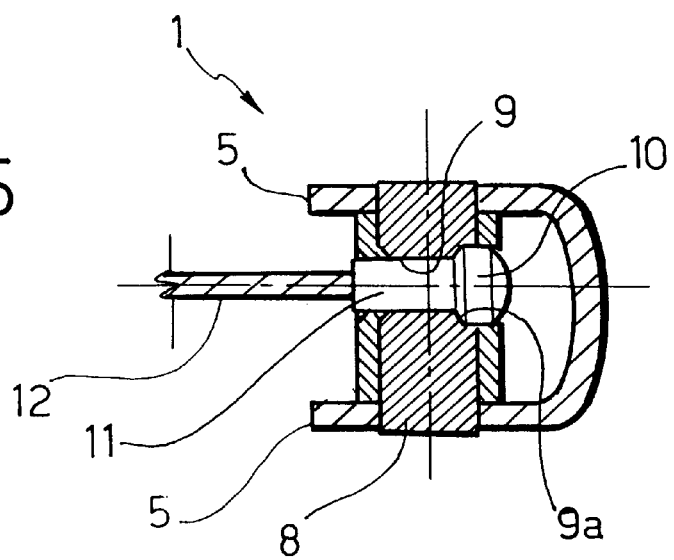
Figure 6:
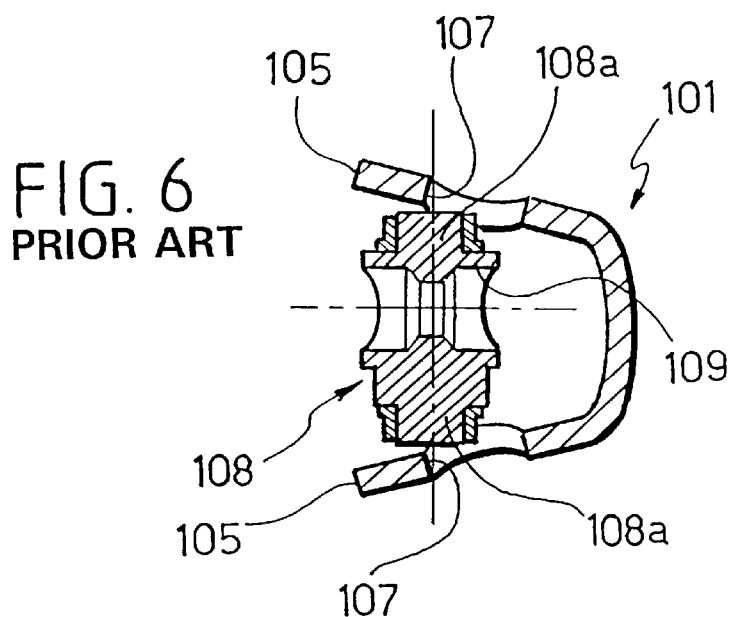
Figure 7:
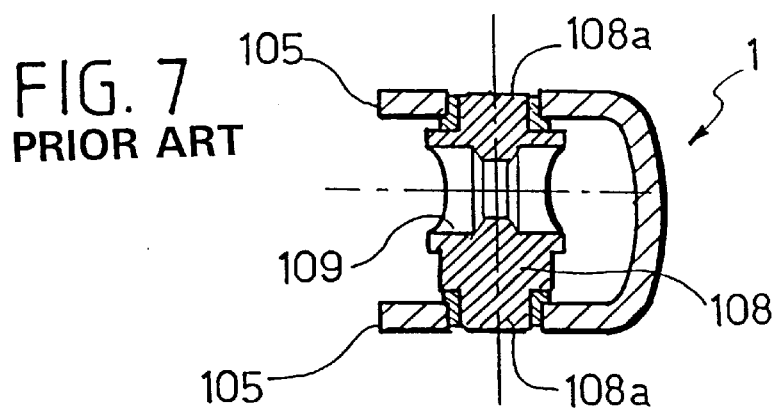
Figure 8:
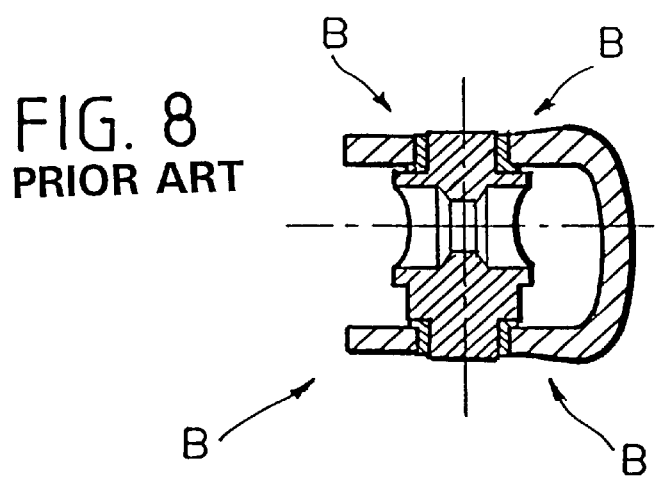

The invention will be now described with reference to the annexed drawings, given purely by way of non limiting example, in which:

FIG. 1 is a rear perspective view of a preferred embodiment of the brake actuating lever according to the invention, FIG. 2 is a front perspective view of the lever of FIG. 1, which also shows the anchoring pin for anchoring the cable and the metal bush associated therewith, in an exploded condition, FIGS. 3, 4 and 5 show a cross-sectional of view of the lever in a plane comprising the axis of the anchoring pin, in three different stages of the operation for anchoring the cable, and FIGS. 6, 7, 8 are similar to FIGS. 3, 4, 5 and relate to the prior art.

In the drawings, reference numeral 1 generally designates a brake actuating lever for a bicycle, particularly a race bicycle. The main feature of the lever 1 lies in that it has a body 2 made in one piece of thermoplastic material, such as acetalic plastic material, reinforced with fibres, particularly carbon fibres. The body 2 is substantially channel-shaped, particularly at its end portion 3 comprising a bottom wall 4 and two wings 5. The wings 5 have a first pair of facing holes 6 for engagement of the articulation pin (not shown in FIG. 1) for articulation of lever 1 to the associated supporting body (not shown) which is to be mounted on the bicycle handlebar. The wings 5 further have a second pair of facing holes 7 for engagement of a pin 8 (see FIG. 2) for anchoring the brake cable.

The operation requested for connecting the end of the brake actuating cable to the anchoring pin 8 is shown in FIGS. 3, 4, 5. As clearly shown in these figures, and in FIG. 2, the anchoring pin 8 has a transverse hole 9 for engagement of the end of the brake actuating cable. As shown in FIGS. 3–5, the hole 9 has an enlarged end portion 9a which is to receive an enlarged head 10 (FIG. 5) of an end body 11, for instance made of lead, which is pressed on the end of a metal cable 12 for actuating the brake.

As clearly shown in FIG. 3, pin 8 is initially positioned with its ends within holes 7 of lever 1 after that a metal bush 13 has been mounted thereon. The bush 13 has its end surfaces facing the inner surfaces of wings 5 of the lever 1 and has two facing transverse holes 14, 15 which are aligned with the transverse hole 9 of the anchoring pin 8. Once pin 8 has been positioned as shown in FIG. 3, the peripheral edge of the hole 14 of bush 13 is deformed within the tapered mouth of hole 9 of pin 8, as indicated by arrows A in FIG. 4. In this manner, the bush 13 is rigidly secured to pin 8, which therefore is prevented from moving axially relative to the wings 5 of lever 1, because of the engagement of the two end surfaces of bush 13 against the wings 5 of the lever. Once pin 8 has been locked in this manner, a cable 12 can be inserted through hole 9, until the head 10 of the end body 11 is engaged against the portion 9a of the transverse hole 9 of the anchoring pin 8.

Due to the above indicated features, it is thus possible to anchor the cable to the lever according to the invention in a simple and rapid manner, although the lever is made of a material which is not adapted to be permanently deformed.

To better clarify the differences of the invention relative to the prior art, an example of the latter is shown in FIGS. 6–8 of the annexed drawings. According to the prior art, a lever 101 having a body of metal material, such as aluminium, has an end portion with two wings 105. While in the case of the invention an anchoring pin 8 having a cylindrical shape is provided, having a uniform diameter substantially corresponding to the diameter of holes 7, in the case of the prior art an anchoring pin 108 is provided which has a relatively complicated shape, with two end portions of reduced diameter 108a. Pin 108 is inserted with these ends 108a within holes 107 formed in the wings 105, due to the possibility to deflect elastic wings 105 (which possibility does not exist in the case of the invention, because of the material selected for making the lever body). Once the pin 108 has been introduced (FIG. 7), it is held axially within lever 101, without the need to provide an auxiliary bush of the type of bush 13 which is instead provided in the case of the present invention, since the portions of pin 108 having greater diameter which are adjacent to the end portions 108a come into abutment against wings 105. Also in the case of the prior art, once the condition of FIG. 7 is reached, pin 108 is permanently locked relative to lever 1 by pressing wings 105 toward each other, as indicated by arrows B in FIG. 8. This operation can not be made in the case of the invention, because of the materials selected for the lever body.

Therefore, as clearly apparent from the foregoing description, the lever according to the invention is characterised by being extremely light, due to the use of the thermoformable material reinforced with long structural fibres. At the same time, the adoption of a thermoplastic matrix renders the body of the lever adapted to be welded by ultrasounds. For example, with reference to FIG. 1, to the lower part of the lever a plate of plastic material is welded for reinforcing the structure of the lever by forming a box-like structure which greatly improves torsion resistance and is adapted to act as a support for a change speed actuating lever of the bicycle (not shown) which is arranged immediately behind the brake actuating lever.

Notwithstanding the use of the fibre reinforced thermoformable material, which is neither adapted to be elastically deformed as in the case shown in FIG. 6 for the prior art, nor to be pressed as in the case shown in FIG. 8, the lever according to the invention can be assembled easily and rapidly with the associated anchoring pin 8 for anchoring the brake actuating cable, as described above.

Naturally, while the principle of the invention remains the same, the details of construction and the embodiment may widely vary with respect to what has been described and illustrated purely by way of example, without departing from the scope of the present invention.

What is claimed is:

1. Brake actuating lever for a bicycle comprising a body including a channel-shaped end portion, with two wings having a first pair of facing holes for engagement of an articulation pin for articulation of the lever to a supporting body, and a second pair of facing holes for engagement of the ends of an anchoring pin for anchoring a brake actuating cable, said anchoring pin having a transverse hole for engagement of one end of the cable, wherein the body of the lever is made in one piece of thermoformable material reinforced with structural fibres and wherein an insert having a box-like cross-section is welded to the lever so as to improve the torsion resistance.

2. Brake lever according to claim 1, wherein said thermoformable material is reinforced with long structural fibres selected among carbon, kevlar or AKZO-M5 (trademark).

3. Brake lever according to claim 1, wherein the anchoring pin for anchoring the cable has a uniform diameter and has its two ends engaged within respective facing holes of the end portion of the lever and is surrounded by a metal bush having its ends facing the inner surfaces of the two wings of said end portion, and two transverse opposite holes which are aligned with the transverse hole of the anchoring pin, the edge of one of said transverse holes of the bush being deformed within the facing end of the transverse hole of the anchoring pin, so as to rigidly connect said bush to said anchoring pin, which is thus held on the lever.

* * * * *